United States Patent [19]

Brown

[11] 3,884,860

[45] May 20, 1975

[54] CARBOXY-FUNCTIONAL SILICONES

[75] Inventor: Lawrence H. Brown, Midland, Mich.

[73] Assignee: Dow Corning Corporation, Midland, Mich.

[22] Filed: Apr. 15, 1974

[21] Appl. No.: 460,849

[52] U.S. Cl. 260/29.2 M; 117/161 ZA; 260/46.5 E; 260/46.5 Y; 260/448.2 B; 260/448.2 N; 260/824 R; 260/827
[51] Int. Cl. ............................................. C08f 11/04
[58] Field of Search .......... 260/827, 824 R, 29.2 M, 260/46.5 E, 46.54, 448.2 B, 448.2 N; 117/161 ZA

[56] References Cited
UNITED STATES PATENTS

| | | | |
|---|---|---|---|
| 3,729,444 | 4/1973 | Bey et al. | 260/46.5 Y |
| 3,767,690 | 10/1973 | Speier | 260/46.5 E |

*Primary Examiner*—Melvyn I. Marquis
*Attorney, Agent, or Firm*—Norman E. Lewis

[57] ABSTRACT

Organopolysiloxanes containing phenyl substituents and carboxyl groups attached to the silicon atom by a thioether linkage are useful as resin intermediates in water-reducible coating formulations.

8 Claims, No Drawings

CARBOXY-FUNCTIONAL SILICONES

The present invention relates to novel polysiloxanes containing carboxy-thioether functionality. In one aspect, the invention relates to a polysiloxane resin characterized as being water-dispersible.

A great number of paints and industrial coating formulations are solvent-based. Because of the difficulties of solvent disposal, the current trend is toward coating compositions in the form of aqueous emulsions or dispersions. The dispersions are water based but contain minor amounts of water-miscible solvents. Since most organopolysiloxanes are hydrophobic in nature, it is difficult to combine siloxanes with hydrophilic polyesters or acrylates in aqueous coating formulations.

The present invention provides organopolysiloxanes containing combined thioether-carboxy functionality which have enhanced water solubility characteristics.

Thus, it is an object of the present invention to provide novel organopolysiloxanes containing carboxy-thioether functionality. It is another object of the invention to provide stable silicone-containing aqueous coating compositions. These and other objects of the invention will be apparent to one skilled in the art upon consideration of the following detailed description and appended claims.

DETAILED DESCRIPTION OF THE INVENTION

In accordance with the invention there is provided a copolymeric organopolysiloxane consisting essentially of (a) from 10 to 65 mol percent of siloxy units selected from the group consisting of $$\text{HOOCRCH}_2\text{CH}_2\text{SiO}_{3/2} \text{ and } \text{HOOCRCH}_2\text{CH}_2\underset{R'}{\text{SiO}},$$

in which R is selected from the group

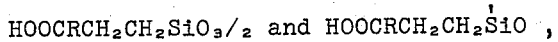

and divalent radicals composed of carbon, hydrogen and sulfur, the sulfur atoms being present in the form of thioether linkages, said divalent radical containing from 1 to 7 carbon atoms; and R' is selected from the group consisting of methyl, phenyl and vinyl radicals; and (b) from 35 to 90 mol percent of siloxy units of the formula $R'_n\text{SiO}_{(4-n)/2}$ in which R' is as defined and $n$ is an integer having a value of from 1 to 3; at least 30 mol% of all the siloxane units in said copolymer having a degree of substitution of 1, said siloxane copolymer having an overall degree of substitution of from about 1.2 to 1.8 with from 15 to 55 percent of the total substituents present being phenyl groups.

In the carboxy-functional siloxane units (a) the divalent bridging group, R, can be a $$-\text{CH}_2\underset{\underset{\text{COOH}}{|}}{\text{CH}}\text{S}-$$

radical or a divalent thioether-containing radical of from 1 to 7 carbon atoms, for example —CH$_2$S—, —(CH$_2$)$_6$—S—,

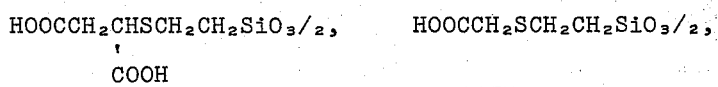

R' substituents can also be present in siloxane units (a); these R' groups including methyl, phenyl and vinyl radicals.

Exemplary siloxy units (a) include $$\underset{\underset{\text{COOH}}{|}}{\text{HOOCCH}_2\text{CHSCH}_2\text{CH}_2\text{SiO}_{3/2}}, \quad \text{HOOCCH}_2\text{SCH}_2\text{CH}_2\text{SiO}_{3/2},$$

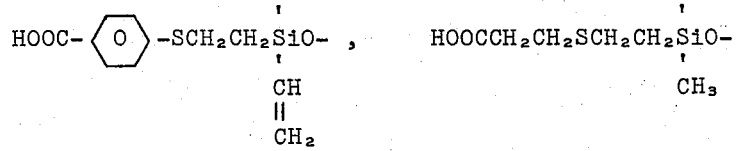

and 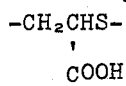

The remaining copolymeric units (b) are of the formula $R'_n\text{SiO}_{(4-n)/2}$ wherein R' is defined and $n$ has a value of from 1 to 3. Thus, the siloxane units can be mono- di- or trifunctional and include CH$_3$SiO$_{3/2}$, $$\text{C}_6\text{H}_5\text{SiO}_{3/2}, \quad \text{CH}_2\text{=CHSiO}_{3/2}, \quad (\text{CH}_3)_2\text{SiO}-, \quad \text{C}_6\text{H}_5(\text{CH}_3)\text{SiO}-,$$

$$(\text{C}_6\text{H}_5)_2\text{SiO}-, \quad \text{CH}_2\text{=CH}(\text{CH}_3)\text{SiO}-, \quad (\text{CH}_3)_3\text{SiO}_{1/2},$$

$$\text{CH}_3(\text{C}_6\text{H}_5)_2\text{SiO}_{1/2}, \quad \text{CH}_2\text{=CH}(\text{CH}_3)(\text{C}_6\text{H}_5)\text{SiO}_{1/2},$$

$$\text{C}_6\text{H}_5(\text{CH}_3)_2\text{SiO}_{1/2} \text{ and the like.}$$

3

As described above, the amounts of di- and trisubstituted siloxy units present in the copolymer are limited to the extent that at least 30% of the copolymeric units are monosubstituted and the overall degree of substitution for the copolymer is in the range of 1.2 to 1.8. These limitations are necessary to obtain a copolymer which will cure to a resin-like material suitable for use in protective coating formulations. At least 10 mol percent of the carboxy-thioether functional siloxanes (a) must be present in order to obtain a polymer capable of being dispersed in water. It is preferred that the copolymer contain at least 20 mol percent of (a) units to provide ease in dispersing the material. The phenyl content of the copolymer is important both from the standpoint of protective coating properties and in obtaining compatibility with certain hydrophilic resins used in water-dispersible coatings. A preferred phenyl content of from 25 to 55% provides optimum compatibility with polyester resins.

The copolymeric siloxanes of the present invention are prepared by the hydrolysis and condensation of corresponding chlorosilanes to obtain a siloxane containing at least 10 percent of siloxy units which have vinyl-functionality. This hydrolysis and condensation is carried out by conventional methods which may optionally include a bodying step to reduce silanol content of the siloxane. This vinyl-functional siloxane is then reacted with a mercapto-acid in the presence of a free radical catalyst to provide the requisite carboxy-thioether functionality. As shown in U.S. Pat. No. 3,729,444 and in the examples herein, the addition of —SH to $CH_2=CHSi\equiv$ is carried out in a solvent at room temperature or above. In some cases, small amounts of the —SH addition may occur at the carbon atom alpha to the silicon.

These copolymeric siloxanes are dispersed in water with the aid of alkaline materials, specifically a nitrogenous base. The exact nature of the nitrogenous base selected to aid dispersibility is not a primary feature of the invention. Ammonia is a suitable base, as are aliphatic amines such as monomethylamine, diethylamine, trimethylamine, triethylamine and morpholine. Alkanol amines, such as N,N-dimethylethanol amine, tolyl ethanol amine, N-ethyl ethanol amine, N-methyl diethanol amine N-butyl ethanol amine, N,N-diisopropanol ethanol amine, and N,N(2-ethylhexyl)isopropanol amine can also be used. Sufficient nitrogenous base should be added to water dispersions to neutralize at least about 75% of the carboxy-thioether functionality. It is preferred to utilize a stoichiometric amount of nitrogenous base, providing the salt form of the carboxy-functional copolymer.

The above-described salts of the copolymers with a nitrogenous base are especially useful in formulating coating compositions with other water dispersible resins such as polyesters and acrylics. The copolymeric siloxanes may be used as polybasic acids in admixture with other organic acids and polyols in the synthesis of polyesters. The carboxy-functionality of such siloxanes also renders such materials useful as curing agents for epoxide resins.

The nitrogenous salts of the above copolymers are water-dispersible and usually require the presence of a minor proportion of a water-miscible solvent to obtain coating formulations having any appreciable shelf life.

4

Suitable water-miscible solvents include dioxane, ethanol, isopropanol, methylethylketone, 2-ethoxyethanolacetate, butoxyethanol, 2-ethoxydiethylene glycol, 2-butoxydiethylene glycol and the like. These are the type of solvents utilized in formulating water dispersions of polyacrylates and polyesters. Water dispersible polyesters and acrylic polymers are known in the art and commercially available. Suitable hydrophilic acrylic resins can be obtained by solution polymerization of lower alkyl ($C_1-C_4$) esters of acrylic acid which can be rendered even more hydrophilic by providing residual hydroxy functionality, such as described in U.S. Pat. No. 3,655,602. Water dispersible polyester resins are prepared by the reaction of a polyol, for example neopentyl glycol and a mixture of carboxylic acids and anhydrides, such as phthalic anhydride, adipic acid and trimellitic anhydride. This type of oil-free polyester resin is commercially available from a number of suppliers. As with the acrylates, amino resins are used as crosslinkers for the oil-free polyesters.

Coating formulations containing the salt of the siloxane copolymer and the water dispersible resin can then utilize an "exempt" solvent system, providing economics both in the cost of raw materials and in minimizing toxicity and safety hazards. The presence of the siloxane copolymer in the coating provides high temperature stability and superior weathering properties. It is preferred that the siloxane copolymer be present in an amount in the range of 20 to 50 weight percent based on the combined weight of polymer solids. The coating formulations can be applied by conventional methods, such as roller-coating, spraying, brushing or dripping, to various solid substrates, for example metal, wood, stone and synthetic polymers. The coating can be clear or pigmented with conventional dyes or fillers, such as silica, titanium dioxide, talc, mica, carbon black, aniline dyes and powdered metals.

The following examples are illustrative and not intended to be limiting of the invention delineated in the claims.

EXAMPLE 1

A mixture of 111.6 parts of a vinyl-functional silicone resin and 0.24 parts of t-butylperbenzoate in 14.4 parts butyl Cellosolve were added dropwise to 20.16 parts of thioglycolic acid in 30.24 parts of butyl Cellosolve in a stirred flask. The thioglycolic acid solution had been previously heated to 28°C and the addition rate was adjusted to maintain to reaction mixture temperature at 45°C. Upon completion, this addition, a solution of 0.4 parts t-butylperbenzoate in 36 parts butyl Cellosolve, was added to the reaction mixture which was then heated to 60°C. Upon cooling, titration with an iodine solution showed that greater than 90% of the mercaptan groups had reacted.

The silicone resin starting material was a copolymer containing 7.5 mol percent $CH_3SiO_{3/2}$ units, 37.5 mol percent $C_6H_5SiO_{3/2}$ units, 30 mol percent $(CH_3)_2SiO$ units, 20 mol percent $CH_3(CH_2=CH)SiO$ units and 5 mol percent $(CH_3)_3SiO_{1/2}$ units. The described vinyl to —SH addition yielded the corresponding siloxane containing 20 mol percent

units as a 70 weight percent solution in butyl Cellosolve.

Stoichiometric amounts of dimethyl/ethanolamine were added to several samples of the above type of copolymer solution providing a pH of about 8 when the amine salts of the siloxane were added to water to form 40 percent dispersions. The siloxane copolymer-butyl cellosolve-water mixtures were stable and exhibited only slight haziness after 378 days. A similar sample containing a 10 percent excess of the amine was utilized to form a 40% dispersion having a pH of greater than 9. This dispersion remained clear after 378 days. It is apparent that the invention provides a shelf stable aqueous dispersion of a siloxane resin.

EXAMPLE 2

A series of siloxane resins having varying amounts of $CH_3(CH_2=CH)SiO$ units were reacted with stoichiometric amounts of thioglycolic acid in the presence of a catalytic amount of t-butyl perbenzoate or benzoyl peroxide in the manner described above. The compositions of the reaction products are given below as is the notation of the stability of the triethylamine solvent-free aqueous solution.

In view of the well-known insolubility of siloxane resins, it is quite surprising that 50% solutions of amine salts of the described resin can be formed and even more surprising that such solutions are stable for over one year. The higher phenyl content of these resins renders the materials especially useful as paint intermediates.

EXAMPLE 3

When the reaction product of thioglycolic acid with a siloxane copolymer comprised of 20 mol percent $CH_2=CHSiO_{3/2}$, 30 mol percent of $(CH_3)_2SiO$ and 50 mol percent $C_6H_5SiO_{3/2}$ is reacted with an excess of dimethanolamine, the amine salt of the carboxy-thioether functional siloxane is soluble in a combination of water and methylethyl ketone.

EXAMPLE 4

Siloxane copolymers containing various amounts monovinylsiloxy units were reacted with thioglycolic acid in the presence of benzoyl peroxide in methylethyl ketone or butyl Cellosolve. Carboxy-thioether functional siloxanes of the following composition were obtained.

| Siloxane Copolymer (mol %) | Amine Salt % of Stoichiometric Amount | Wt. % Solids in Solution | Solution Appearance Initial | After 378 Days |
|---|---|---|---|---|
| 50 % HOOCCH$_2$SCH$_2$CH$_2$SiO- / CH$_3$ | | | | |
| 15% (C$_6$H$_5$)$_2$SiO- | | | | |
| 30% C$_6$H$_5$SiO$_{3/2}$ | | | | |
| 5% (CH$_3$)$_3$SiO$_{1/2}$ | 100% | 46.2% | Clear | Clear |
| 60% HOOCCH$_2$SCH$_2$CH$_2$SiO / CH$_3$ | 90% | 50% | Clear | Trace amount of Precipitate |
| 5% (CH$_3$)$_2$SiO | | | | |
| 30% C$_6$H$_5$SiO$_{3/2}$ | | | | |
| 5% (CH$_3$)$_3$SiO$_{1/2}$ | 100% | 50% | Clear | Perfectly Clear |
| 50% HOOCCH$_2$SCH$_2$CH$_2$SiO / CH$_3$ | 90% | 50% | Clear | Slight Insoluble Film on Surface |
| 15% (CH$_3$)$_2$SiO | | | | |
| 30% C$_6$H$_5$SiO$_{3/2}$ | | | | |
| 5% (CH$_3$)$_3$SiO$_{1/2}$ | 100% | 50% | Clear | Perfectly clear |
| 40% HOOCCH$_2$SCH$_2$CH$_2$SiO / CH$_3$ | 90% | 50% | Clear | Very slight haze |
| 25% (CH$_3$)$_2$SiO | | | | |
| 30% C$_6$H$_5$SiO$_{3/2}$ | | | | |
| 5% (CH$_3$)$_3$SiO$_{1/2}$ | 100% | 50% | Clear | Perfectly clear |

| Siloxane | HOOCCH$_2$SCH$_2$CH$_2$Si-O$_{3/2}$ | CH$_2$=CHSiO$_{3/2}$ | (CH$_3$)$_2$SiO | (C$_6$H$_5$)$_2$SiO | (CH$_3$)$_3$SiO$_{1/2}$ |
|---|---|---|---|---|---|
| A | 27 | 3 | 32.5 | 32.5 | 5 |
| B | 36 | 4 | 27.5 | 27.5 | 5 |
| C | 45 | 5 | 22.5 | 22.5 | 5 |
| D | 54 | 6 | 17.5 | 17.5 | 5 |

Composition — Mole Percent

When the above copolymers are neutralized with an amine, such as dimethyl amine, or ammonia the salts are water dispersible and can be used in combination with water-reducible polyesters.

EXAMPLE 5

When thiobenzoic acid is reacted with the siloxane described in Example 1 following the same procedure there is obtained a copolymeric siloxane containing

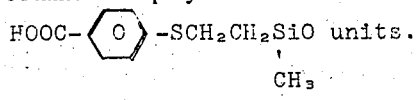 -SCH$_2$CH$_2$SiO units.
$\qquad\qquad\qquad\qquad$ |
$\qquad\qquad\qquad\qquad$ CH$_3$

EXAMPLE 6

A 70% butyl Cellosolve solution of a siloxane copolymer comprised of 30 mol percent HOOCCH$_2$SCH$_2$CH$_2$SiO$_{3/2}$, 32.5 mol percent (CH$_3$)$_2$SiO, 32.5 mol percent (C$_6$H$_5$)$_2$SiO and 5 mol percent (CH$_3$)$_3$SiO$_{1/2}$ was utilized in combination with a commercially available water-dispersible polyester resin as the binder in a paint formulation of the following composition: 29 wt.% TiO$_2$, 0.3 wt.% Ramapo Blue (pigment), 17.3 wt.% Arolon 465 (a water-dispersible oil-free polyester available from Ashland Chemical Co.), 10.5 wt.% of the described siloxane copolymer, 7.2 wt.% of a commercially available methoxylated melamine (crosslinker), 22.3 wt.% distilled water, 8.8 wt.% glycol monobutyl ether, 3.5 wt.% triethylamine and 0.2 wt.% diethylethanol amine. The paint had a total solids (pigment and binder) content of 64.3% with 30 wt. percent of the resin binder being the siloxane.

This paint was coated onto anodized aluminum panels and cured for 60 seconds at 450°F resulting in a coating with a 3T flexibility and F pencil hardness. For purposes of comparison, this paint and an equivalent formulation based only on the polyester resin were exposed in a Dewcycle Weatherometer. The nonsilicone formulation exhibited severe chalking (rating of 2) after 200 hours exposure while the paint containing the copolymer of the invention showed only a trace of chalking (rating of 9.5) after 1,000 hours exposure. These data clearly demonstrate that conventional coating resins can be upgraded by use in combination with the novel siloxane copolymers.

EXAMPLE 7

A solvent (ethylacetate-toluene-butylacetate) blend of 30 weight percent of a siloxane copolymer comprising 20 mol% HOOCCH$_2$SCH$_2$CH$_2$SiO$_{3/2}$, 30 mol% (CH$_3$)$_2$SiO, 35 mol% C$_6$H$_5$SiO$_{3/2}$ and 15 mol% (C$_6$H$_5$)$_2$SiO and 70 weight percent of a polyacrylate comprising 37.8 mol% methylmethacrylate, 37.8 mol% ethyl acrylate, 16.8 mol% butyl acrylate and 7.6 mol% glycidyl methacrylate was utilized to form a solvent-based paint. A 50–50 blend of the same resins was also utilized in this manner. These coatings were "set to touch" in 3 minutes and dried hard in 75 minutes at room temperature. The paint formulations cured via reaction of the epoxy-functional polyacrylate with the carboxy-thioether functionality of the siloxane resin. No other catalysts or crosslinkers were utilized. Becauses of this reaction, the siloxane resin should be mixed with the pigmented acrylic just prior to use.

For purposes of comparison, paints based on the silicone-modified acrylic and on a comparable unmodified acrylic were tested in an unfiltered Weatherometer. Paints based on the unmodified acrylic resin failed by showing severe visible checking (rating of 0) after 400 hours while the silicone-modified acrylic paints exhibited only a slight amount of micro checks (rating of 9–10) after 400 hours.

EXAMPLE 8

A mixture of 85.9 weight percent of the carboxysiloxane solution described in Example 1 and 14.1 weight percent of the diglycidyl ether of Bisphenol-A (Dow Epoxy Resin 332) was poured into an aluminum dish which was then placed on a hotplate at 155°C. After 5 minutes, the solvent had evaporated and the contents of the cup had gelled to an immobile resin, giving evidence of reaction between the carboxyl group of the silicone and the epoxide group of the organic resin.

Control samples of the epoxide resin alone and of the polysiloxane solution alone were still fluid after 15 minutes at 155°C.

Reasonable modification and variation are within the scope of the present invention which is directed to novel siloxane copolymers and coating compositions incorporating such copolymers.

That which is claimed is:

1. A copolymeric organopolysiloxane consisting essentially of (a) from 10 to 65 mol percent of siloxy units selected from the group consisting of HOOCRCH$_2$CH$_2$SiO$_{3/2}$ and

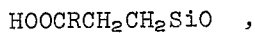

in which R is R is selected from the group

and divalent radicals consisting of carbon, hydrogen and sulfur, the sulfur atoms being present in the form of thioether linkages, said divalent radical containing from 1 to 7 carbon atoms; and R' is selected from the group consisting of methyl, phenyl and vinyl radicals; and (b) from 35 to 90 mol percent of siloxy units of the formula R'$_n$SiO$_{(4-n)/2}$ in which R' is as defined and $n$ is an integer having a value of from 1 to 3; at least 30 mol% of all the siloxane units in said copolymer having a degree of substitution of 1, said siloxane copolymer having an overall degree of substitution of from about 1.2 to 1.8 with from 15 to 55 percent of the total substituents present being phenyl groups.

2. A copolymeric organopolysiloxane of claim 1 wherein at least 20 mol percent of siloxy units (a) are present.

3. A copolymeric organopolysiloxane of claim 1 where in the siloxy units (a) R is a —$CH_2S$— radical.

4. The nitrogenous base salt of the copolymeric organopolysiloxane of claim 1.

5. The salt of claim 4 wherein said nitrogenous base is triethylamine.

6. The salt of claim 4 wherein said nitrogenous base is dimethylethanol amine.

7. An aqueous coating composition comprising the salt of claim 4.

8. An aqueous coating composition in accordance with claim 7 comprising a water-dispersible oil-free polyester and a water-miscible solvent.

* * * * *